(12) United States Patent
Lenze et al.

(10) Patent No.: US 10,184,158 B2
(45) Date of Patent: Jan. 22, 2019

(54) METHOD FOR HOT FORMING, IN PARTICULAR FOR PRESS HARDENING

(71) Applicants: ThyssenKrupp Steel Europe AG, Duisburg (DE); ThyssenKrupp AG, Essen (DE)

(72) Inventors: Franz-Josef Lenze, Lennestadt (DE); Janko Banik, Altena (DE); Sascha Sikora, Lunen (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 364 days.

(21) Appl. No.: 14/790,337

(22) Filed: Jul. 2, 2015

(65) Prior Publication Data
US 2016/0010169 A1    Jan. 14, 2016

(30) Foreign Application Priority Data
Jul. 8, 2014 (DE) .................. 10 2014 109 552

(51) Int. Cl.
| | |
|---|---|
| *C21D 7/13* | (2006.01) |
| *B21J 1/06* | (2006.01) |
| *B21J 5/06* | (2006.01) |
| *C21D 1/673* | (2006.01) |
| *B21C 37/02* | (2006.01) |
| *B23P 9/00* | (2006.01) |
| *C21D 1/18* | (2006.01) |

(52) U.S. Cl.
CPC ............... *C21D 7/13* (2013.01); *B21C 37/02* (2013.01); *B21J 1/06* (2013.01); *B21J 5/06* (2013.01); *B23P 9/00* (2013.01); *C21D 1/673* (2013.01); *C21D 1/18* (2013.01); *C21D 2221/00* (2013.01)

(58) Field of Classification Search
CPC ....................................................... C21D 7/13
USPC ....................................................... 148/643
See application file for complete search history.

(56) References Cited

U.S. PATENT DOCUMENTS

| | | | |
|---|---|---|---|
| 2009/0211669 A1 | 8/2009 | Vehof | |
| 2013/0205863 A1 | 8/2013 | Loesch | |
| 2014/0144560 A1 | 5/2014 | Yamano et al. | |

FOREIGN PATENT DOCUMENTS

| | | |
|---|---|---|
| CN | 102212742 A | 10/2011 |
| CN | 103003003 A | 3/2013 |
| CN | 103687968 A | 3/2014 |
| DE | 102004038626 B3 | 2/2006 |

*Primary Examiner* — Brian D Walck
(74) *Attorney, Agent, or Firm* — The Webb Law Firm

(57) ABSTRACT

A method for hot forming, in particular for press hardening, a component is disclosed, wherein in a local region of the component a reduced martensitic hardness is produced by locally reducing a forming pressure which is exerted on a surface of the component.

6 Claims, 1 Drawing Sheet

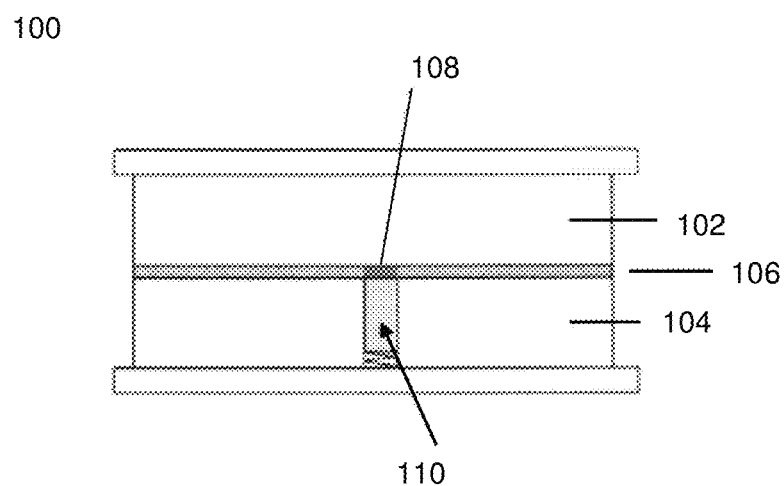

METHOD FOR HOT FORMING, IN PARTICULAR FOR PRESS HARDENING

CROSS-REFERENCE TO RELATED APPLICATION

This application claims priority to German Patent Application No. 102014109552.9 filed Jul. 8, 2014, the disclosure of which is hereby incorporated in its entirety by reference.

BACKGROUND OF THE INVENTION

Field of the Invention

The present invention relates to a method for hot forming, in particular for press hardening, a component, in particular for a vehicle.

Description of Related Art

On account of their high characteristic strength values, hot formed or press hardened components, respectively, are inter alia employed in vehicle construction as safety-relevant components. As the contact pressure per unit area increases, the hardness in the material increases on account of higher cooling rates. Excessive hardness in the material implies a higher probability of a fracture arising in the component which has been manufactured from the material. There is a requirement for a method which is suitable in mass production for hot forming, in particular for press hardening, components which in a predefined local region have a reduced hardness and thus a lower probability of brittle fractures arising.

Some press hardening methods for producing a locally differentiated material hardness, such as partial press hardening, for example, are already known in the prior art. In the case of tailored tempering, for example, the pressing tools are only partially heated during hot forming. By way of targeted temperature control, a mixed microstructure with reduced strengths is produced in a localized manner here. However, here a martensitic formation of the material is suppressed in a targeted manner by way of reduced cooling rates. In a localized manner, tensile strengths of between 500 and 950 MPa are set. The resulting Vickers hardness is in the range of 170 HV to 320 HV, which may compromise the use of the component as a lightweight element.

Likewise, there are attempts at modifying the alloy composition of the tool steel such that the tool steel has a locally reduced heat conductivity, on account of which the cooling rate of the component to be pressed drops in a localized manner and thus a lower hardness is achieved in a localized manner. In such alloy concepts with locally reduced heat conductivities according to the prior art, an operating temperature has to be first set in order to obtain a reduced cooling rate of the material to be hardened. From the point of view of production, this does not represent a reliable process. Therefore, attempts including alloy compositions of the tool steel which have been especially modified for press hardening to date have not been implemented in large-scale production environments.

SUMMARY OF THE INVENTION

It is an object of the present invention to provide a reliable and reproducible method which is suitable for large-scale mass production for hot forming, in particular for press hardening, a component, which in predefined local regions of the component to be formed enables martensitic and/or martensitic/bainitic hardening, wherein the resulting hardness in the predefined local regions is reduced in relation to the other regions of the component.

The object of the present invention is achieved by a method for hot forming, in particular for press hardening, a component, wherein in a local region of the component a reduced martensitic hardness is produced by locally reducing a forming pressure which is exerted on a surface of the component.

In contrast to the prior art, the drive device according to the invention here has the advantage that a reduced martensitic hardness is obtained in the predefined local regions, such that the probability of hydrogen embrittlement on the predefined local regions is significantly reduced. On account thereof, the probability of brittle fractures arising in the predefined local regions, in particular on account of stress peaks which could result during or after the assembly of the component with other components, is again significantly reduced. This is due to the stress created on the martensitic boundary surfaces being able to be dissipated by adaptive deformations.

Advantageous design embodiments and refinements of the invention may be derived from the dependent claims and from the description with reference to the drawings.

In one further embodiment it is provided that regulating the locally reduced forming pressure is performed by means of an element which is spring-mounted in a lower tool and/or in an upper tool of a hardening tool.

On account of the use of spring-mounted tool elements, a technical implementation of the necessary cooling conditions in order to implement a desired martensitic formation with the desired reduced hardness is enabled in an advantageous manner. On account of the use of the spring-mounted elements a locally reduced contact pressure per unit area in comparison with the other regions is achieved on the material to be formed when the hardening tool is being closed, on account of which the cooling rate is reduced in a localized manner and thus the locally resulting martensitic hardness is lower than in the other regions of the material, in particular steel sheet, to be formed. Moreover, the previously used tool steels may furthermore be advantageously further utilized in a slightly modified form.

If a spring-mounted element is embedded both in the lower tool as well as in the upper tool of the hardening tool, localized reduction of a martensitic hardness can be obtained in a simple and thus advantageous manner on both facing sides of the steel sheet to be formed. If the layer thickness of the steel sheet to be formed is modest, localized spatial reduction of a martensitic hardness which permeates the respective cross section may even be obtained in the steel sheet to be formed. On account thereof, a direction for the adaptive deformations in the resulting component which are created by stress can be predetermined.

In one further embodiment, that side of the spring-mounted element that faces the surface of the component contacts in a form-fitting manner the surface of the component, and a forming accuracy in the local region conforms to a remaining forming accuracy in further regions of the component.

On account thereof, it can be advantageously achieved that the forming accuracy of the steel sheet to be formed is retained, since cooling takes place at full contact in the forming tool.

According to one further embodiment it is provided that regulating the locally reduced forming pressure is implemented by means of a gas pressure spring and/or a disc spring and/or an elastic spring as the spring-mounted element.

On account of the use of a gas pressure spring a force which is almost independent of the spring travel can be advantageously generated, wherein the space requirement is low and at the same time there exists the potential for a damping mechanism to be simultaneously integrated in the spring.

On account of the use of disc springs, the spring travel may be varied depending on a type of configuration; if the spring disc is assembled as a spring pack, the spring force of the individual disc spring can be multiplied by the number of disc springs, meaning a high spring force at short spring travel; if the spring disc is assembled as a spring stack, the spring force of the individual disc spring is equal to the spring force of the entire spring stack, meaning low spring force at long spring travel. On account thereof, the spring-mounted tool elements can be readily adapted in terms of their dimensions to the tool steels which are used for press hardening.

In one further embodiment it is provided that the spring-mounted element is mounted in a die and/or mould region of the lower tool and/or of the upper tool of the hardening tool.

On account thereof, installation space which is already present is advantageously utilized, such that no additional installation space is required.

In one further embodiment it is provided that a hydraulic installation is embedded in the lower tool and/or in the upper tool of the hardening tool.

On account thereof, fine tuning of the forming pressure which is exerted in a localized manner on the steel sheet to be formed is advantageously implemented.

The present invention furthermore comprises a device for hot forming, in particular for press hardening, a component, characterized in that the device is configured for producing in a targeted manner a local region with a reduced martensitic hardness in the component, by locally reducing a forming pressure which is exerted on a surface of the component.

The device advantageously enables to counteract a brittle martensitic formation in predefined localized regions of the component by way of a reduced martensitic hardness.

In one further embodiment, the device comprises the following means:
- a lower tool which is configured for receiving on its upper side a component in a form-fitting manner;
- an upper tool which is configured so as to be pushed by way of its lower side in the direction towards the upper side of the lower tool when the device is being closed, wherein the lower tool and/or the upper tool have/has a clearance which is configured for receiving a spring-mounted element.

In one further embodiment it is provided that the spring-mounted element, by way of its side that faces the surface of the component, is configured so as to surround the component in a form-fitting manner.

In one further embodiment it is provided that the clearance comprises a die and/or mould region.

In one further embodiment it is provided that the spring-mounted element comprises a gas pressure spring and/or a disc spring and/or an elastic spring.

In one further embodiment it is provided that a hydraulic installation is incorporated in the lower tool and/or in the upper tool of the device.

Further details, features, and advantages of the invention are derived from the drawing and from the following description of preferred embodiments by means of the drawing. The drawing here merely illustrates exemplary embodiments of the invention, which do not limit the substantial concept of the invention.

BRIEF DESCRIPTION OF THE DRAWING

FIG. 1 shows a device for hot forming, in particular press hardening, a component.

DESCRIPTION OF THE INVENTION

A device 100 for hot forming, in particular for press hardening, a component 106 is schematically illustrated in FIG. 1. The device is composed of an upper tool 102 and a lower tool 104 between which the component 106 to be formed is disposed in the hot forming process, in particular when press hardening.

An element 110, which in comparison with the remaining surface of the lower tool 104 exerts a reduced forming pressure on a local region 108 of the component 106 during the press hardening process, is embedded in the lower tool 104. On account of a reduced forming pressure being exerted in the local region 108 of the component 106, the cooling conditions are modified such that the cooling rate in comparison with the remaining region of the surface of the lower tool 104 is reduced. On account of the reduced cooling rate in the local region 108 of the component 106 it is achieved that the resulting martensitic hardness in the local region 108 of the component 106 in comparison with the remaining regions of the component 106 is reduced.

Exerting a reduced contact pressure per unit area in the local region 108 of the component 106 is achieved in that the element 110 which is embedded in the lower tool 104 is spring mounted. In one embodiment of the invention, the spring-mounted element 110 may be configured as a gas pressure spring or a disc spring or an elastic spring. Installations based on the hydraulic principle may also be incorporated in the forming table. In the case of all embodiments, the effective contact pressure per unit area acting on the local region 108 of the component 106 may be regulated by way of the spring force.

In one further embodiment, the spring-mounted element 110 may be embedded in the upper tool 102. In one further embodiment, spring-mounted elements 110 may be embedded both in the lower tool 104 as well as in the upper tool 102. In all embodiments, the contact face which is directed towards the component 106 adjoins thereon in a form-fitting manner, such that on the one hand cooling takes place in the forming tool 100 at full contact, and on the other hand a forming accuracy is retained during press hardening. In one further embodiment, the spring-mounted element 110 is disposed in the die and/or mould region of the tool.

A substantial constructive modification of previously utilized press tools is thus not required. The embodiments described of the device 100 according to the invention for press hardening meet the criteria of reproducibility, controllability, and safety, such that the resulting method according to the invention is suitable for press hardening in large-scale mass production. By way of regulating in a targeted manner the forming pressure which is exerted in the local region 108 of the component 106 by the spring-mounted element 110, the degree of hardness of the localized martensitic formation can be set in a targeted manner, such that undesirable hydrogen embrittlement can be counteracted in a targeted manner according to the local material requirements which are predefined by stress peaks during or after the assembly of the component 106 with other components.

LIST OF REFERENCE SIGNS

100 Device for hot forming, in particular for press hardening
102 Upper tool
104 Lower tool
106 Component
108 Local region with reduced hardness
110 Spring-mounted element

The invention claimed is:

1. Method for hot forming, comprising press hardening a component by:
exerting a first positive forming pressure on the surface of a first portion of the component, wherein the first positive forming pressure is exerted by a portion of a hardening tool contacting the surface of the first portion of the component;
and exerting a second positive forming pressure on a surface of a second portion of the component, wherein the second positive forming pressure is exerted by a portion of the hardening tool contacting the surface of the second portion of the component,
wherein the first positive forming pressure is less than the second positive forming pressure and, after press hardening, the first portion of the component has a reduced martensitic hardness as compared to the second portion of the component.

2. Method according to claim 1, wherein regulation of the first positive forming pressure is performed by an element which is spring-mounted in at least one of a lower tool and an upper tool of the hardening tool.

3. Method according to claim 2, wherein a side of the spring-mounted element that faces the surface of the component contacts in a form-fitting manner the surface of the component, and a forming accuracy in the local region conforms to a remaining forming accuracy in further regions of the component.

4. Method according to claim 1, wherein regulation of the first forming pressure is implemented by at least one of a gas pressure spring, a disc spring, and an elastic spring as a spring-mounted element.

5. Method according to claim 2, wherein the spring-mounted element is mounted in at least one of a die and a mould region of at least one of the lower tool and the upper tool of the hardening tool.

6. Method according to claim 2, wherein a hydraulic installation is embedded in at least one of the lower tool and the upper tool of the hardening tool.

* * * * *